United States Patent
Doittau et al.

(10) Patent No.: US 7,180,659 B2
(45) Date of Patent: Feb. 20, 2007

(54) MULTIPLE FIELD CASSEGRAIN-TYPE OPTICAL COMBINATION

(75) Inventors: François-Xavier Doittau, Behoust-Orgerus (FR); Dominique Moreau, Issy-les-Moulineaux (FR); Joël Rollin, Saint Priest en Jarez (FR)

(73) Assignee: Thales, Neuilly sur Sein (FR)

( * ) Notice: Subject to any disclaimer, the term of this patent is extended or adjusted under 35 U.S.C. 154(b) by 181 days.

(21) Appl. No.: 10/498,496

(22) PCT Filed: Dec. 10, 2002

(86) PCT No.: PCT/FR02/04264

§ 371 (c)(1),
(2), (4) Date: Jun. 14, 2004

(87) PCT Pub. No.: WO03/054609

PCT Pub. Date: Jul. 3, 2003

(65) Prior Publication Data

US 2005/0036219 A1    Feb. 17, 2005

(30) Foreign Application Priority Data

Dec. 14, 2001   (FR) ................... 01 16240

(51) Int. Cl.
*G02B 17/00* (2006.01)
*G02B 21/00* (2006.01)
*G02B 23/00* (2006.01)

(52) U.S. Cl. .............. 359/365; 359/364; 359/366
(58) Field of Classification Search ........ 359/364–366, 359/432
See application file for complete search history.

(56) References Cited

U.S. PATENT DOCUMENTS

| | | |
|---|---|---|
| 3,781,552 A | 12/1973 | Kadrmas |
| 4,840,465 A | 6/1989 | Loy et al. |
| 4,902,098 A | 2/1990 | Rollin et al. |
| 4,907,867 A | 3/1990 | Perrin et al. |
| 4,988,858 A | 1/1991 | Pinson |
| 4,993,818 A | 2/1991 | Cook |
| 5,013,142 A | 5/1991 | Rollin et al. |
| 5,202,792 A | 4/1993 | Rollin et al. |
| 5,247,173 A | 9/1993 | Benchetrit et al. |
| 5,387,933 A | 2/1995 | Fouilloy et al. |
| 5,477,395 A | 12/1995 | Cook |
| 5,969,860 A * | 10/1999 | Mearns .............. 359/432 |
| 6,118,583 A * | 9/2000 | Rogers .............. 359/432 |
| 6,181,486 B1 | 1/2001 | Forestier et al. |

\* cited by examiner

*Primary Examiner*—Drew A. Dunn
*Assistant Examiner*—Joshua L Pritchett
(74) *Attorney, Agent, or Firm*—Lowe Hauptman & Berner, LLP

(57) ABSTRACT

The invention is directed to multispectral multifield optical combinations that are intended to be integrated into an optical device. A Cassegrain-type multifield optical combination has an image focal plane, comprising a first holed concave primary mirror that is fixed relative to the image focal plane and a convex secondary mirror.

22 Claims, 2 Drawing Sheets

MULTIPLE FIELD CASSEGRAIN-TYPE OPTICAL COMBINATION

FIELD OF THE INVENTION

The invention relates to the field of multispectral multifield optical combinations intended to be integrated into an optical device, especially into an imaging device.

Imaging devices are used in airborne, naval or terrestrial applications in which the imaging devices carry out, for example target detection, recognition and identification functions, target tracking and locating functions and laser illumination and laser countermeasure functions.

DESCRIPTION OF PRIOR ART

The imaging device comprises an input optic that is advantageously formed, wholly or partly, by the multispectral multifield optical combination forming the subject matter of the invention. Said optical combination preferably relates to the input optic of one or more light signal receive channels. The number of receive channels is, for example, at least three, these having, as spectral sensitivity range, the near infrared or infrared band I, the mid-infrared or infrared band II and the far infrared or infrared band III respectively. The three receive channels are therefore isolated from one another, for example using spectral splitters. Preferably, the near-infrared channel is a multitask channel, which includes telemetry, laser spot detection, passive imaging and active imaging, whereas the mid-infrared and far infrared channels are dedicated to passive imaging.

A multispectral multifield optical combination generally comprises at least two fields and generally covers at least two spectral sensitivity ranges. The various fields have different functions, for example the widest field is used for target acquisition whereas the narrowest field is used to identify and/or track said target. The spectral sensitivity ranges of the multispectral multifield optical combination are, for example, the range from the visible on the one hand to the infrared on the other.

A multispectral multifield optical combination has several drawbacks, which include, when the spectral range is spread and when the number of different fields increases, considerable chromatic dispersion combined with a bulky and complex architecture. Two types of optical combination can a priori be envisioned, namely dioptric or refractive optical combinations, that is to say those based on lenses, and catadioptric or reflective optical combinations (that is to say those based on mirrors). A refractive multispectral optical combination usually exhibits very substantial chromatic dispersion. A catadioptric multifield optical combination usually has a high volume and a high complexity.

According to first prior art, it is known to produce a multispectral multifield optical combination using mirrors or combinations of the zoom type or of the bifocal system type that are located in each of the receive channels. The multispectral multifield optical combination obtained has the drawback of being very bulky and very complex.

According to second prior art described in patent application FR 98/06894, it is known to produce a multispectral multifield optical combination using a Cassegrain-type setup. The setup proposed has a drawback of being only a two-field setup, that is to say it is limited to two fields, which is insufficient for certain imaging devices.

The invention proposes a multispectral multifield optical combination which is a three-field combination, is relatively compact and the chromatic dispersion of which remains relatively low. The multispectral multifield optical combination according to the invention adopts the Cassegrain-type setup of the second prior art, to which is added a third field called "wide field" that is obtained by the addition of a wide-field focusing optic and by the particular modification of the path of the light intended to be focused before it is optionally taken up by a transport optic. Unless otherwise indicated, there is no difference between "light" and "light signal". In the wide-field configuration, said light passes via the wide-field focusing optic without passing via the mirrors of the Cassegrain setup. To pass into the wide-field configuration from the medium-field configuration, all that is required is to move, from among the mirrors of the Cassegrain setup, just the secondary mirror. The invention also proposes a method of changing field in a multispectral multifield optical combination.

SUMMARY OF THE INVENTION

The invention provides a Cassegrain-type multifield optical combination having an image focal plane, comprising a first holed concave primary mirror that is fixed relative to the image focal plane and a convex secondary mirror, the structure and the position, in narrow-field configuration, of the mirrors being such that the light that emanates from an external scene considered as being located at infinity and is intended to be focused in the image focal plane is meanwhile reflected firstly by the first primary mirror and then by the secondary mirror, which also includes a second holed concave primary mirror that can move relative to the image focal plane, the structure and the position, in medium-field configuration, since the medium field is wider than the narrow field, of the mirrors being such that the light that emanates from an external scene considered as being located at infinity and is intended to be focused in the image focal plane is meanwhile reflected firstly by the second primary mirror and then by the secondary mirror, characterized in that the secondary mirror can move relative to the image focal plane, and in that the optical combination also includes a wide-field focusing optic that can move relative to the image focal plane, the structure and the position, in wide-field configuration, since the wide field is larger than the medium field, of the mirrors and of the wide-field focusing optic being such that the light that emanates from an external scene considered as being located at infinity and is intended to be focused in the image focal plane by means of the wide-field focusing optic is not meanwhile reflected by any of said primary or secondary mirrors.

The invention also provides a method of changing field in a Cassegrain-type multifield optical combination comprising a narrow-field primary mirror, a medium-field primary mirror and a secondary mirror, comprising, when passing from a narrow-field configuration to a medium-field configuration, a step of moving the medium-field primary mirror so that the medium-field primary mirror blocks the light reflected by the narrow-field primary mirror in the direction of the secondary mirror, characterized in that the method also includes, during passage from a medium-field configuration to a wide-field configuration, a step of moving the secondary mirror and of moving a wide-field focusing optic so that the wide-field focusing optic focuses the light coming from the outside without it being reflected by one of the primary or secondary mirrors of the optical combination.

The medium field is both narrower than the wide field and wider than the narrow field. The Cassegrain setup allows the architecture to be readily made multispectral since the mirrors, for example made of aluminum, exhibit very little chromatic dispersion. The optical combination according to the invention could also be used within a single spectral sensitivity range, but it would lose its benefit.

BRIEF DESCRIPTION OF THE DRAWINGS

The invention will be more clearly understood and other features and advantages will become apparent from the following description and the appended drawings, given by way of examples, in which.

DETAILED DESCRIPTION OF A PREFERRED EMBODIMENT

Figure 1:
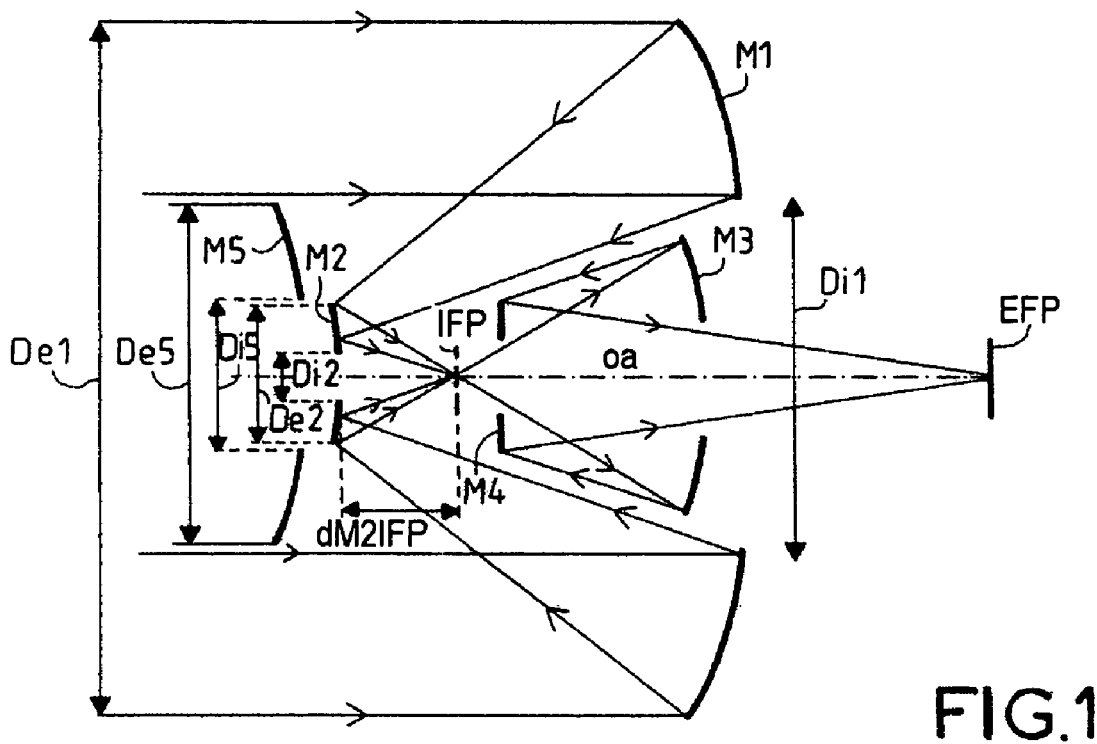
FIG. 1 shows schematically an example of a multispectral multifield optical combination according to the invention in the narrow-field configuration.

Preferably, in the optical combination according to the invention, the image focal plane is an intermediate image focal plane. The optical combination therefore also has an exit image focal plane, located downstream of the intermediate focal plane, the upstream-downstream direction corresponding to the direction of propagation of the light arriving from the outside, to be focused, that is to say from the left to right in all the FIGS. 1 to 4. To transport the image of the intermediate focal plane to the exit image focal plane, the optical combination includes a transport optic located between the intermediate image focal plane and the exit image focal plane. Said transport optic consists of two holed transport mirrors, that are fixed relative to the intermediate image focal plane and lie between the intermediate image focal plane and the exit image focal plane and are structured and arranged so that the light that emanates from an image located in the intermediate image focal plane and is intended to form an image in the exit image focal plane is meanwhile firstly reflected by the transport mirror closest to the exit image focal plane, since the said mirror is concave, and then reflected by the transport mirror closest to the intermediate image focal plane. The light signals of the various spectral bands corresponding to the detectors of the various receive channels are split just downstream of the transport optic; the optical combination therefore preferably has not additional transport optic after the splitting of the various spectral bands. The presence of a transport optic has the advantage of giving the optical combination a large mechanical extension between the rear of the primary mirror of the narrow-field configuration and the exit focal plane, thus making it easy to position the spectral splitting elements without requiring additional transport optics. The transport optic is preferably structured and placed in such a way that the exit pupil of the optical combination is located near the transport mirror closest to the intermediate focal plane, said exit pupil advantageously lying inside the transport optic, that is to say between the two mirrors that constitute the transport optic. However, this focusing in the exit image focal plane carried out directly after spectral splitting without the use of an additional transport optic has the drawback of making pupil conjugation on the cold screen of the infrared detectors of the various receive channels difficult, and this produces a flux of parasitic structure which is added to the flux of parasitic structure resulting from the central blocking due to the Cassegrain setup. It may therefore be necessary to add means for reducing flux of parasitic structure, which has the drawback of increasing the complexity of the optical combination but to a lesser extent than if additional transport optics were to be added after the spectral splitting. Among conventional means of reducing flux of parasitic structure, mention may be made by way of examples of the fitting of cold or low-emissivity baffles of the oriented mirror type or microtrihedral surfaces, or else the use of materials with a negative luminescence.

To pass from a medium-field configuration to a wide-field configuration, one example of a method of changing field according to the invention comprises a step of moving the secondary mirror and the wide-field focusing optic. Preferably, this single step is sufficient for passing into the wide-field configuration. Said movement step consists of a simultaneous linear translation of the secondary mirror and the wide-field focusing optic. To do this, the optical combination according to the invention includes a system for the simultaneous linear translation of the secondary mirror and of the wide-field focusing optic. The secondary mirror and the wide-field focusing optic are therefore advantageously integral. The translation is preferably performed along the optical axis of the optical combination until the focal plane of the wide-field focusing optic coincides with the image focal plane closest to the secondary mirror, that is to say the intermediate image focal plane when the optical combination has two image focal planes. The imbalance is preferably compensated for by means of an imbalance compensation mechanism, this mechanism having, however, the drawback of being relatively complex.

In a preferred embodiment of an optical combination according to the invention of the type comprising a translational movement of the secondary mirror and of the wide-field focusing optic, the secondary mirror consists of a metallization of the peripheral part of the rear face of the final optical element of the wide-field focusing optic. Thus, in the case of a purely refractive wide-field focusing optic, the central part of the final lens of the wide-field focusing optic serves as a field lens in the wide-field configuration, whereas the peripheral part of said final lens serves as secondary mirror in both the narrow-field configuration and the wide-field configuration.

To pass from a medium-field configuration to a wide-field configuration, one example of a method of changing field according to the invention comprises a step of moving the secondary mirror and the wide-field focusing optic. Preferably, this single step is sufficient to pass into the wide-field configuration. Said movement step consists of a rotation that brings the wide-field focusing optic into position, while retracting the secondary mirror. To do this, the optical combination includes a rotation system for bringing the wide-field focusing optic into position while retracting the secondary mirror. The secondary mirror and the wide-field focusing optic are advantageously mounted on a structure that can rotate and that includes one or more weights for compensating for the imbalance. The imbalance compensation mechanism here is much simpler insofar as it is limited to a few weights placed on the structure comprising the secondary mirror and the wide-field focusing optic, said weights thus making it possible to balance said structure, which remains balanced throughout the rotation movement.

The structure, the secondary mirror, the wide-field focusing optic and the weight or weights are all integral with one another. Thus, a simple rotation movement allows the secondary mirror to be retracted in favor of the wide-field focusing optic, without the need for a complementary imbalance-compensating mechanism.

In the optical combination according to the invention, the wide-field focusing optic is preferably purely refractive. Thus, the wide-field focusing optic is very compact. The wide-field focusing optic, although purely refractive, is not excessively dispersive, since the magnification in the wide-field configuration is not very high, and there is therefore less "image separation" than in the medium-field or narrow-field configurations. When the wide-field focusing optic is in position in the optical combination in the wide-field configuration, the image focal plane of the wide-field focusing optic coincides with the first image focal plane encountered downstream of the secondary mirror in the other configurations, this first image focal plane being the intermediate image focal plane when the optical combination has two focal planes.

Preferably, the advantageously purely refractive wide-field focusing optic has a short focal length and a small diameter, its focal length being smaller than the distance between, on the one hand, the advantageously holed central part of the secondary mirror in the narrow-field or medium-field configuration and, on the other hand, the image focal plane closest to the secondary mirror, its diameter being smaller than the external diameter of the secondary mirror. The wide-field focusing optic is advantageously a multi-spectral optic, the spectral sensitivity range of which extends from the visible into the far infrared. Thanks to its short focal length and its small diameter, this multispectral wide-field focusing optic can be produced for a relatively low cost. In an optional variant, this wide-field focusing optic is no longer multispectral—its spectral sensitivity range is limited to the far infrared—this being operationally conceivable on account of the fact that the wide-field configuration is generally limited to the operation of target detection. The cost of this final, wide-field focusing optic whose sensitivity range is limited to the infrared band III is even lower.

FIG. 1 shows schematically an example of a multispectral multifield optical combination according to the invention in the narrow-field configuration. The optical axis oa of the optical combination is depicted by the dot-dash line, the optical combination being a centered optical system having substantially a symmetry of revolution about the said optical axis oa. Unless otherwise indicated, there is no difference between "light", "light rays" and "light signal". The path of the light rays is depicted by arrows directed along the direction of propagation of said light rays. The light rays depicted by dotted arrows represent light rays masked or blocked by elements of the optical combination. The optical combination according to the invention comprises a first primary mirror M1, a secondary primary mirror M5, a secondary mirror M2, a first transport mirror M3 and a second transport mirror M4, the transport mirrors M3 and M4 constituting the transport optic. Since the optical combination according to the invention is of the Cassegrain type, the "primary" mirror and "secondary" mirror naming is given by analogy with the conventional Cassegrain setup, depending on the function of the mirrors in question. The optical combination has an image focal plane located just downstream of the secondary mirror M2, that is to say the intermediate image focal plane IFP.

The optical combination has another image focal plane located downstream of the transport optic, that is to say the exit image focal plane EFP. For reasons of simplicity and legibility of FIG. 1, a single exit image focal plane EFP has been depicted; the usual imaging devices include spectral splitting elements that are not depicted in FIG. 1 for the same reasons, but which would be located between the first transport mirror M3 and the various exit image focal planes.

The first primary mirror M1 is concave, its external diameter being De1, and is holed in its central part, its internal diameter being Di1; it is structured and placed in such a way that, in the narrow-field configuration (as in FIG. 1), it reflects the light rays arriving approximately parallel on its reflecting face, that is to say the light rays emanating from an external scene considered as being located at infinity (rays arriving perfectly parallel could emanate only from a scene truly located at infinity), in the direction of the secondary mirror M2.

The second primary mirror M5 is concave, its external diameter being De5, and is holed in its central part, its internal diameter being Di5; it is structured and placed in such a way that, in the medium-field configuration (see FIG. 2), it reflects the light rays arriving approximately parallel on its reflecting face in the direction of the secondary mirror M2 in a manner similar to the first primary mirror M1, while blocking the light rays reflected by the first primary mirror M1 in the direction of the secondary mirror M2; in the narrow-field configuration (as in FIG. 1), it is offset so as to not block the light rays reflected by the first primary mirror M1 in the direction of the secondary mirror M2. The internal diameter Di5 of the second primary mirror M5 is smaller than the internal diameter Di1 of the first primary mirror M1.

The secondary mirror M2 is convex, its external diameter being De2, and is holed in its central part, internal diameter being Di2; it is structured and placed in such a way that, in the narrow-field configuration (as in FIG. 1), it reflects the light rays arriving on its reflecting face emanating from the first primary mirror M1 (emanating from the second primary mirror M5 in the case of FIG. 2 that depicts a medium-field configuration) in the direction of the first transport mirror M3. Between the secondary mirror M2 and the first transport mirror M3, the light rays are focused in the intermediate image focal plane IFP in order to form an image of the external scene considered as being located at infinity.

The first transport mirror M3 is concave and holed in its central part; it is structured and placed in such a way that, in the narrow-field configuration (as in FIG. 1), it reflects the light rays arriving on its reflecting face emanating from the secondary mirror M2 in the direction of the second transport mirror M4.

The second transport mirror M4 is holed in its central part; it is structured and placed in such a way that, in the narrow-field configuration (as in FIG. 1), it reflects the light rays arriving on its reflecting face emanating from the first transport mirror M3 so that said light rays will be focused in the exit image focal plane EFP to form therein an image of the external scene considered as being located at infinity.

The distance dM2IFP represents the distance that separates the holed central part of the secondary mirror M2 from the intermediate image focal plane IFP. The intermediate image focal plane IFP and the exit image focal plane EFP are fixed relative to the body and to the structure of the optical combination, whatever the field configuration adopted. Likewise, the first primary mirror M1, the first transport mirror M3 and the second transport mirror M4 are fixed whatever the field configuration adopted. In contrast, the second primary mirror M5 and the secondary mirror M2 can move relative to the body of the optical combination and therefore relative to the intermediate image focal plane IFP.

Figure 2:
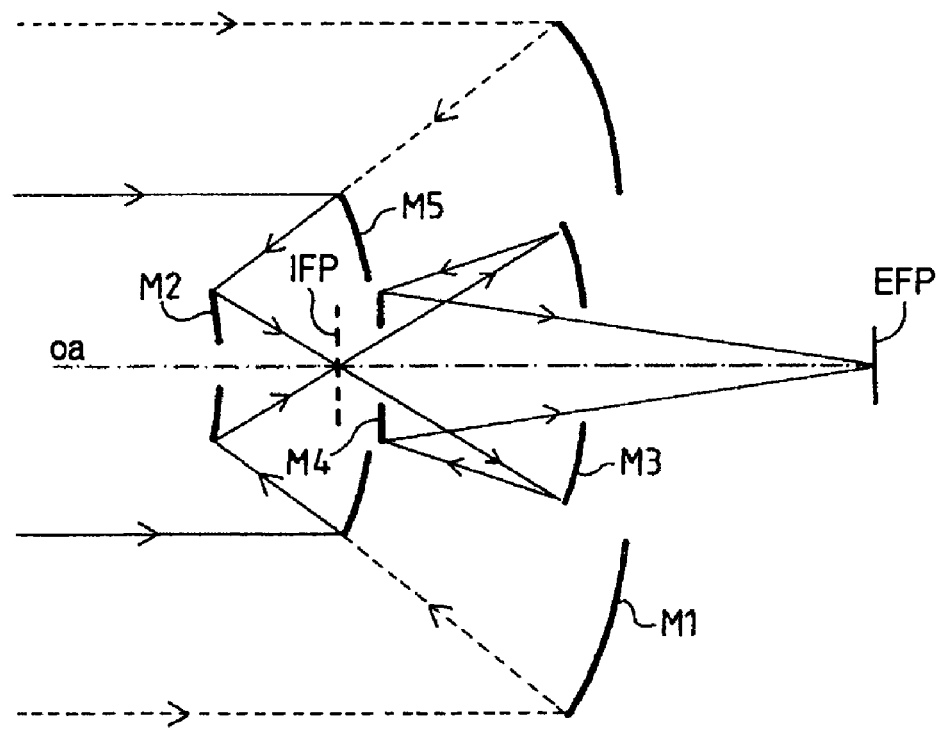
FIG. 2 shows schematically an example of a multispectral multifield optical combination according to the invention in the medium-field configuration.

FIG. 2 shows schematically an example of a multispectral multifield optical combination according to the invention in a medium-field configuration. All the mirrors and image focal planes occupy the same positions as in FIG. 1, that is to say the same positions as in the narrow-field configuration, except for the second primary mirror M5 which has undergone a linear translation in the direction of the transport optic so as, on the one hand, to block the light rays (in dotted lines) emanating from the first primary mirror M1 and, on the other hand, to reflect the light rays arriving approximately parallel on its reflecting surface in the direction of the secondary mirror M2.

Figure 3:
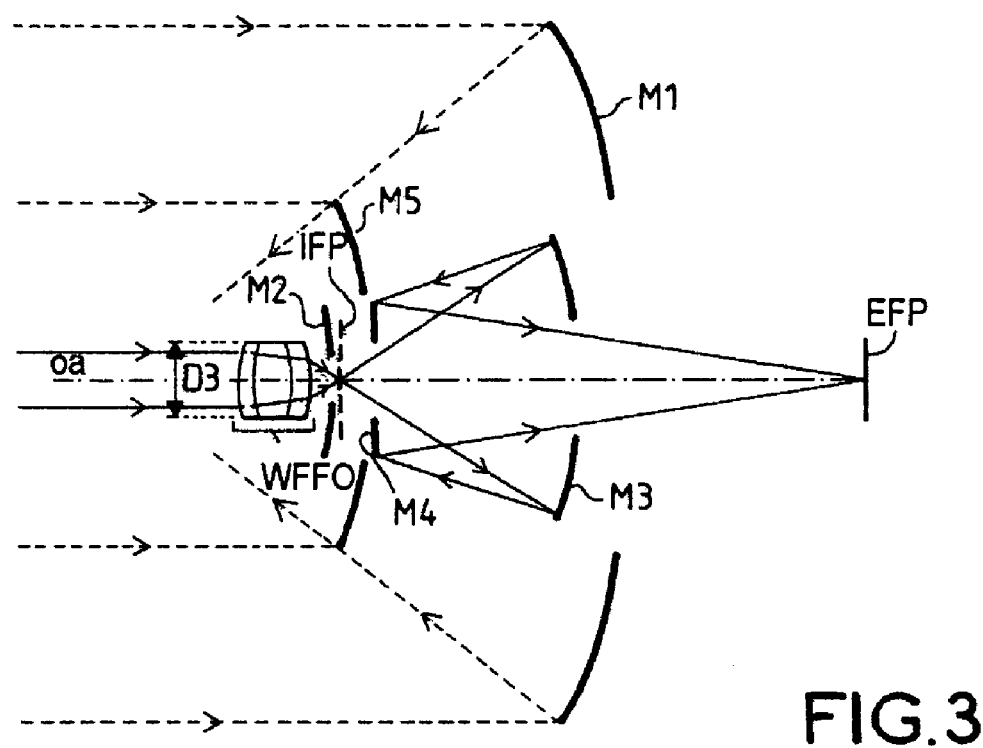
FIG. 3 shows schematically an example of an embodiment of a multispectral multifield optical combination according to the invention in the wide-field configuration.

FIG. 3 shows schematically an example of an embodiment of a multispectral multifield optical combination according to the invention in a wide-field configuration. All the mirrors and image focal planes occupy the same positions as in FIG. 2, that is to say the same positions as in the medium-field configuration, except for the secondary mirror M2 and a wide-field focusing optic WFFO that was not involved in the path of the light rays focused in the image focal planes IFP and EFP and was therefore not depicted in the preceding FIGS. 1 and 2 for the sake of clarity. The integral combination consisting of the secondary mirror M2 and the wide-field focusing optic WFFO has undergone a linear translation in the direction of the transport optic so that, on the one hand, the secondary mirror M2 can no longer focus, in the intermediate focal plane IFP, the light rays reflected by the first primary mirror M1 or by the second primary mirror M5 and, on the other hand, the light rays arriving approximately parallel on the wide-field focusing optic WFFO are focused in the intermediate image focal plane IFP and can then be focused in the exit image focal plane EFP by means of the transport optic. The wide-field focusing optic WFFO has a diameter D3 that is less than the internal diameter De2 of the secondary mirror M2 and a focal length f3 which is shorter than the distance dM2IFP depicted in FIG. 1.

Figure 4:
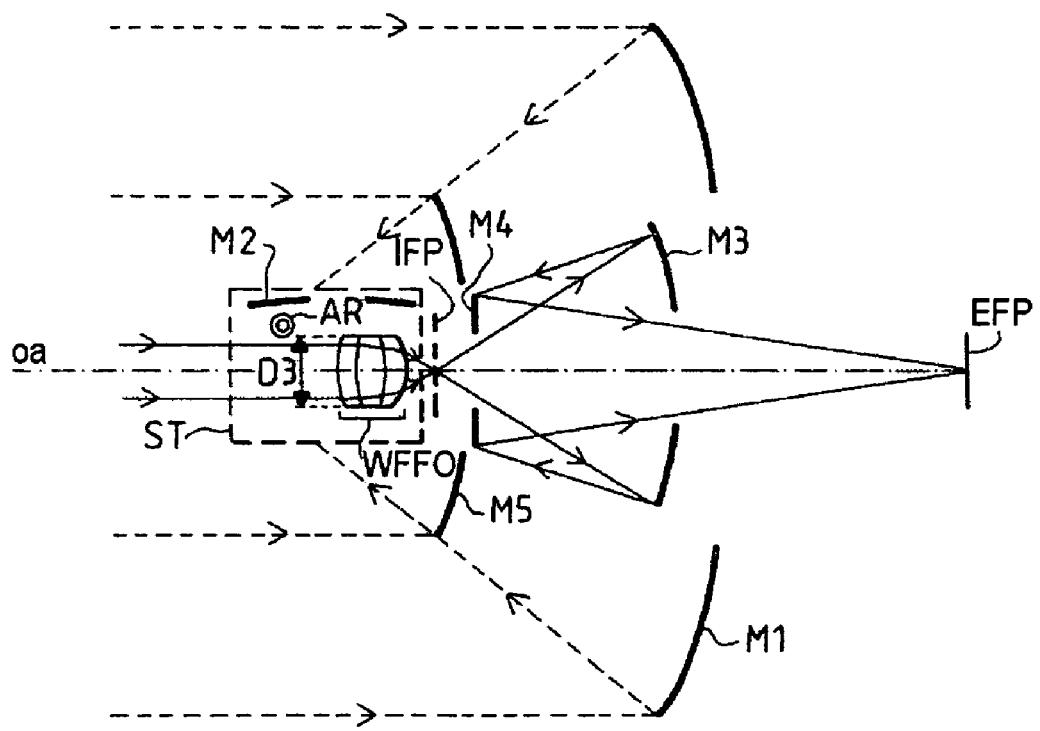
FIG. 4 shows schematically an example of another embodiment of a multispectral multifield optical combination according to the invention in the wide-field configuration.

FIG. 4 shows schematically an example of another embodiment of a multispectral multifield optical combination according to the invention in a wide-field configuration. All the mirrors and image focal planes occupy the same positions as in FIG. 2, that is to say the same positions as in the medium-field configuration, except for the secondary mirror M2 and a wide-field focusing optic WFFO which was not involved in the path of the light rays focused in the image focal planes IFP and EFP and was therefore not depicted in the preceding FIGS. 1 and 2 for reasons of clarity. The integral assembly formed by the secondary mirror M2 and by the wide-field focusing optic WFFO is integrally mounted on a structure ST shown symbolically by a dotted square. The structure ST can rotate relative to an axis of rotation AR. The weights, not depicted here in FIG. 4 for reasons of clarity, are integrally mounted on the structure ST so that the structure ST remains balanced throughout its rotation movement about the axis of rotation AR. The structure ST has undergone a rotation about the axis of rotation AR so that, on the one hand, the secondary mirror M2 can no longer focus, in the intermediate focal plane IFP, the light rays reflected by the first primary mirror M1 or by the second primary mirror M5 and, on the other hand, the light rays arriving approximately parallel on the wide-field focusing optic WFFO are focused in the intermediate image focal plane IFP and can then be focused in the exit image focal plane EFP by means of the transport optic. The wide-field focusing optic WFFO has a diameter D3 that is smaller than the internal diameter De2 of the secondary mirror M2 and a focal length f3 that is less than the distance dM2IFP depicted in FIG. 1.

The invention claimed is:

1. A cassegrain-type multifield optical combination having an image focal plane, comprising:
   a first holed concave primary mirror that is fixed relative to the image focal plane and a convex secondary mirror,
   the structure and the position, in narrow-field configuration, of the mirrors being such that the light that emanates from an external scene considered as being located at infinity and is intended to be focused in the image focal plane is meanwhile reflected firstly by the first primary mirror and then by the secondary mirror, which also includes a second holed concave primary mirror that can move relative to the image focal plane,
   the structure and the position, in medium-field configuration, since the medium field is wider than the narrow field, of the mirrors being such that the light that emanates from an external scene considered as being located at infinity and is intended to be focused in the image focal plane is meanwhile reflected firstly by the second primary mirror and then by the secondary mirror,
   wherein the secondary mirror can move relative to the image focal plane,
   a wide-field focusing optic (WFFO) having a focal length smaller than a distance between the second holed concave primary mirror and the image focal plane that can move relative to the image focal plane simultaneously with said secondary mirror,
   the structure and the position, in wide-field configuration, since the wide field is larger than the medium field, of the mirrors and of the wide-field focusing optic being such that the light that emanates from an external scene considered as being located at infinity and is intended to be focused in the image focal plane by means of the wide-field focusing optic is not meanwhile reflected by any of said primary or secondary mirrors.

2. The optical combination as claimed in claim 1, wherein the image focal plane is an intermediate image focal plane,
   wherein the optical combination also has an exit image focal plane,
   wherein the optical combination includes a transport optic between the intermediate image focal plane and the exit image focal plane, and
   wherein the transport optic consists of two holed transport mirrors that are fixed relative to the intermediate image focal plane, which lie between the intermediate image focal plane and the exit image focal plane and are structured and placed so that the light that emanates from an image located in the intermediate image focal plane and is intended to form an image located in the exit image focal plane is meanwhile firstly reflected by the transport mirror closest to the exit image focal plane, since said mirror is concave, and then reflected by the transport mirror closest to the intermediate image focal plane.

3. The optical combination as claimed in claim 2, wherein the exit pupil of the optical combination is located near the transport mirror closest to the intermediate image focal plane.

4. The optical combination as claimed in claim 1, wherein the wide-field focusing optic is purely refractive.

5. The optical combination as claimed in claim 4, wherein the wide-field focusing optic has a short focal length and a small diameter, its focal length being shorter than the distance between, on the one hand, the central part of the secondary mirror in narrow-field or medium-field configuration and, on the other hand, the image focal plane closest to the secondary mirror, its diameter being smaller than the external diameter of the secondary mirror.

6. The optical combination as claimed in claim 1, wherein the wide-field focusing optic is a multispectral optic, the spectral sensitivity range of which extends from the visible into the far infrared.

7. The optical combination as claimed in claim 1, wherein the optical combination includes a rotation system that brings the wide-field focusing optic into position while retracting the secondary mirror.

8. The optical combination as claimed in claim 7, wherein that the secondary mirror and the wide-field focusing optic are mounted on a structure which can rotate and includes one or more weights to compensate for the imbalance.

9. The optical combination as claimed in claim 1, wherein the secondary minor is holed in its central part and in that the optical combination includes a system for the simultaneous linear translation of the secondary mirror and of the wide-field focusing optic.

10. The optical combination as claimed in claim 9, wherein the secondary mirror and the wide-field focusing optic are integral.

11. The optical combination as claimed in claim 9, wherein the secondary mirror consists of a metallization of the peripheral part of the rear face of the final optical element of the wide-field focusing optic.

12. The imaging device comprising an input optic, comprising an optical combination as claimed in claim 1.

13. The imaging device as claimed in claim 12, wherein the optical combination belongs to the input optic of one or more light-signal receive channels.

14. The imaging device as claimed in claim 13, wherein the number of receive channels is at least three, these having, as spectral sensitivity range, the near infrared, the mid-infrared and the far infrared, respectively.

15. The method of claim 1, wherein the wide-field focusing optic (WFFO) and the secondary mirror are integral.

16. The method of claim 1, wherein the wide-field focusing optic is multispectral and its diameter is less than that of the hole in the second holed primary concave mirror.

17. A method of changing field in a cassegrain-type multifield optical combination comprising a narrow-field primary concave mirror, a medium-field concave primary mirror and a convex secondary mirror, the primary mirrors being holed, when passing from a narrow-field configuration to a medium-field configuration, comprising the steps of:

a step of moving the medium-field primary mirror so that the medium-field primary mirror blocks the light reflected by the narrow-field primary mirror in the direction of the secondary mirror, during passage from a medium-field configuration to a wide-field configuration, a step of moving the secondary mirror and of moving a wide-field focusing optic simultaneously with said secondary mirror, so that the wide-field focusing optic focuses the light coming from the outside without it being reflected by one of the primary or secondary mirrors of the optical combination the wide-field focusing optic having a focal length smaller then a distance between the secondary holed mirror.

18. The method of changing field as claimed in claim 17, wherein the wide-field focusing optic (WFFO) is purely refractive.

19. The method of changing field as claimed in claim 18 wherein, since the secondary mirror is holed in its central part, the step of moving the secondary mirror and the wide-field focusing optic consists of a simultaneous linear translation of the secondary mirror and of the wide-field focusing optic.

20. The method of changing field as claimed in claim 18, wherein the step of moving the secondary mirror and the wide-field focusing optic consists of a rotation that brings the wide-field focusing optic into position while retracting the secondary mirror.

21. The method of changing field as claimed in claim 17 wherein, since the secondary mirror is holed in its central part, the step of moving the secondary mirror and the wide-field focusing optic consists of a simultaneous linear translation of the secondary mirror and of the wide-field focusing optic.

22. The method of changing field as claimed in claim 17 wherein the step of moving the secondary mirror and the wide-field focusing optic consists of a rotation that brings the wide-field focusing optic into position while retracting the secondary mirror.

* * * * *